United States Patent [19]

King

[11] Patent Number: 5,123,790
[45] Date of Patent: Jun. 23, 1992

[54] METHOD AND APPARATUS FOR MILLING GROOVES

[75] Inventor: Freddie G. King, Rome, Ga.

[73] Assignee: Westinghouse Electric Corp., Pittsburgh, Pa.

[21] Appl. No.: 666,172

[22] Filed: Mar. 7, 1991

[51] Int. Cl.⁵ .......................... B23C 1/20; B23B 39/00
[52] U.S. Cl. ...................... 409/132; 408/76; 409/178
[58] Field of Search ............ 409/132, 175, 178, 183, 409/131, 179; 269/8; 408/76

[56] References Cited

U.S. PATENT DOCUMENTS

| Re. 30,519 | 2/1981 | Hougen | 408/76 |
| 3,195,375 | 7/1965 | Guibert, Jr. et al. | 408/76 |
| 3,596,358 | 8/1971 | Rydell | 409/178 |
| 3,762,829 | 10/1973 | Yicmaz | 408/76 X |
| 4,288,186 | 9/1981 | Dockal et al. | 409/175 |
| 4,462,726 | 7/1984 | Silvey | 408/76 |

FOREIGN PATENT DOCUMENTS

| 2238838 | 2/1974 | Fed. Rep. of Germany | 408/76 |
| 2552742 | 5/1977 | Fed. Rep. of Germany | 409/175 |
| 464672 | 7/1951 | Italy | 408/76 |
| 50-39479 | 11/1975 | Japan | 408/76 |

*Primary Examiner*—William Briggs
*Attorney, Agent, or Firm*—A. C. Addessi

[57] ABSTRACT

Methods and apparatus for cutting a groove in a structure are disclosed. Large structures such as steam turbines have pumping grooves or similar features which may be machined using the simplified methods and apparatus disclosed. In a preferred embodiment, a milling head affixed to a magnet which may be selectively activated is provided. Additional clamping means are also provided which are affixed to the magnet and engage the structure to further affix and align the apparatus in place. The milling head is positioned at the location of the groove and held fast by the magnet; the additional clamping means ensure the apparatus stays in place while the groove is being cut. The apparatus disclosed may be operated by a single operator using conventional power sources and without the need for extensive set up, fixturing and the like normally associated with milling operations of this nature.

14 Claims, 1 Drawing Sheet

METHOD AND APPARATUS FOR MILLING GROOVES

BACKGROUND OF THE INVENTION

The turbines used to generate electric power are massive pieces of equipment, however, despite their size, these turbines are made up of a number of intricate parts machined to tight tolerances. The size and complexity of these structures makes an easily described operation such as milling a groove over the circumference of the turbine structure a daunting task. Such a situation occurs in the instance of milling pumping grooves on high pressure cylinder joints. A turbine cylinder is typically joined along a horizontal joint wherein two half sections of the housing together form the outer structure of the turbine. Each housing section has a flat area at which a joint is formed. This is also true of many other structures joined at flanges, such as pumps and other processing equipment, mining equipment and industrial machinery. Such flat areas are exposed both during the initial assembly of the equipment and as a result of rebuild or retrofit operations. In any event, the flat surface or flange surface frequently has features such as grooves or passageways cut into its face, such as the pumping grooves mentioned above, that require precise machining to bring them to within tolerance of their specified dimension.

Whether during initial fabrication or for retrofit or maintenance purposes, such milling typically entails setting up a large scale milling machine weighing over two tons at the site of the turbine. The size of the milling machine results in requiring that a special platform be built to support it and special high duty electrical power sources be connected in order to provide the required power. The above-described operation is thus extraordinarily labor intensive and time consuming. Therefore, it would be desirable to lessen the time required to perform such milling operations, to reduce the manpower required and to reduce the complexity and sheer bulk of the equipment required to mill such grooves within large structures such as steam turbines. Providing such improvements will reduce the cost of such milling operations and increase the speed of the operation, contributing to an overall increase in the productivity of this operation.

SUMMARY OF THE INVENTION

Accordingly, it has now been found that the problems encountered using the prior art methods and apparatus may be overcome by apparatus for milling a groove in a structure that comprises a milling head attached to a selectively activated magnet adapted to be affixed to the milling head and affixed to the structure when activated, and a clamp affixed to the magnet that engages the structure to be milled. In a preferred embodiment, the clamp comprises two clamp rods screwed into clamp blocks, each of which has at least one clamp screw in threaded engagement with the clamp block.

The present invention also provides novel methods of cutting grooves in a structure comprising the steps of determining a location where a groove is to be cut, and then placing a milling head that is affixed to a magnet that is selectively activated in that location. The magnet is then activated and clamping means are affixed to the structure to maintain the milling head precisely in the selected position. The milling head may then be activated and the groove cut. Upon completion of a portion of the groove, the magnet and milling head are deactivated, the clamp removed and the apparatus removed to a location where the groove is to be continued. The apparatus and methods of the present invention are useful for both cutting fresh grooves and reconditioning or retrofitting structures which already have grooves therein.

DETAILED DESCRIPTION OF THE PREFERRED EMBODIMENTS

Figure 1:
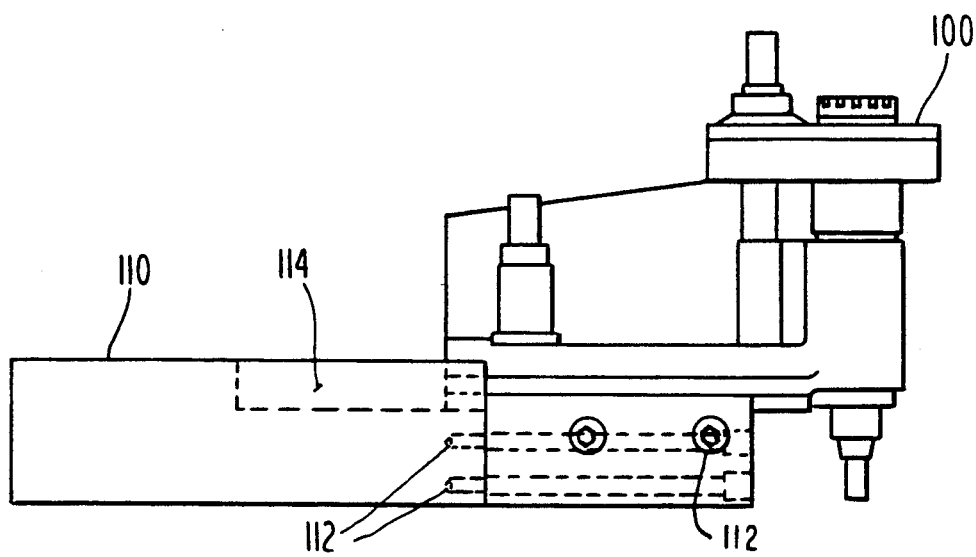
FIG. 1 is a side elevation view of a preferred embodiment of the apparatus of the present invention.
Figure 2:
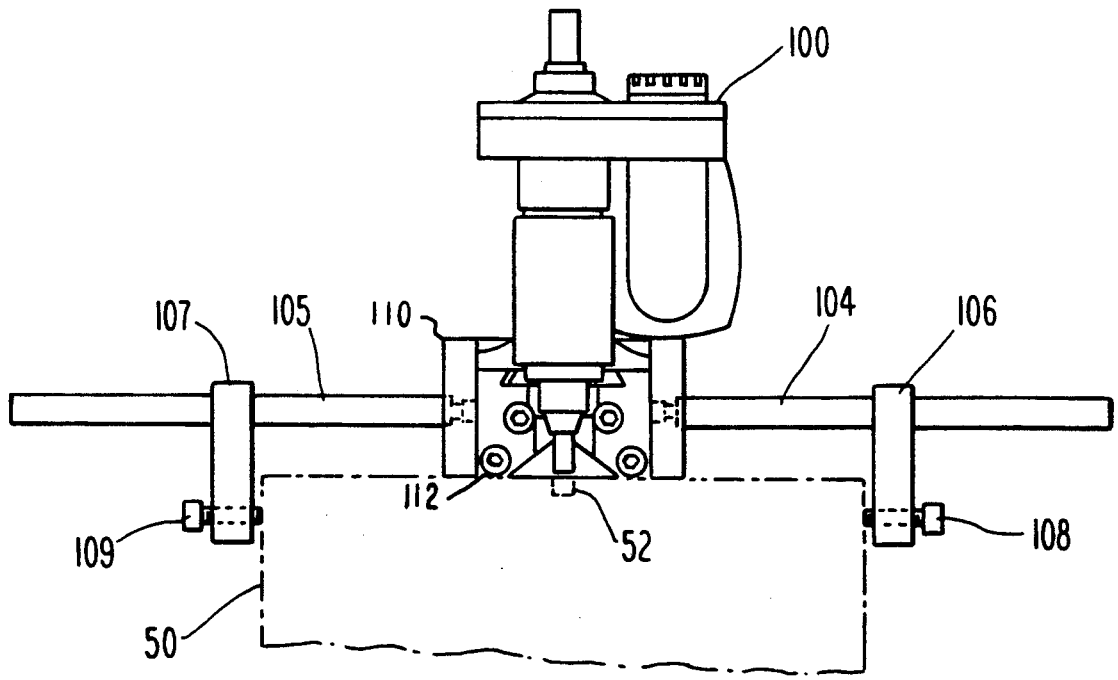
FIG. 2 is a front elevation view of the apparatus depicted in FIG. 1.

Referring now to FIG. 1, there is shown a side elevation view of a preferred embodiment of the apparatus of the present invention. A milling head 100 is provided and is most preferably is of the type that operates using 110 volts. The milling head 100 is chosen using considerations familiar to those of ordinary skill to provide adequate cutting speed, power, a sufficient range of cutter motion and other features to ensure the milling head 100 is adequate to cut the desired groove. The milling head 100 is affixed to a modified magnetic base 110. Preferably, the magnetic base 110 is of the type which may be selectively magnetized. For example, a 110 volt electric magnet of adequate power is Model IT 101 which may be purchased from AEC Magnetics, 2974 Graves Lane, Cincinnati, Ohio, U.S.A. 45241. As illustrated, the magnet 110 is modified to receive attaching hardware 112. As shown in FIGS. 1-2, the attaching hardware 112 firmly affixes the magnet 110 and the milling head 100 together as a unit. Depending upon the geometry of the milling head 100 and magnet 110, configurations of the attaching hardware 112 other than that shown may be necessary to secure these components together. A recess 114 is also preferably provided in the magnet 110 to provide clearance for the milling head 100 as it is moved along the groove being cut.

As shown in FIG. 2, in use, the above-described apparatus is preferably provided with clamp bars 104, 105 and clamp blocks 106, 107 that are affixed to the magnetic base 110 and that are adjustable to engage the structure 50 in which a groove 52 is being cut. Preferably, the clamp blocks 106, 107 are provided with screws 108, 109 which urge against the structure 50 to lock the apparatus accurately in place. Most preferably, the clamp bars 104, 105 are threaded at one end and thereby affixed to the magnetic base 110 by a threaded connection. The clamp blocks 106, 107 are preferably constructed having a hole that permits them to slide over the length of the clamp bars 104, 105. The clamp blocks 106, 107 are then precisely affixed by a set screw or the like, not illustrated, which urges against the clamp bars 104, 105 to hold the clamp blocks 106, 107 in position.

Thus, the present invention uses a small milling machine spindle, most preferably powered by 110 volts and mounted on a magnet, also powered by 110 volts and chosen to provide adequate holding power for the milling operation. Additionally, clamp bars 104, 105 and clamp blocks 106, 107 are provided in an outrigger configuration to maintain proper alignment during the milling operation. As will be readily understood by those of skill in the art, the small, lightweight apparatus of the present invention provides numerous advantages over previously used techniques. Without sacrificing accuracy, the number of personnel required for the milling operation is substantially reduced, as well as the set up time and power requirements. The present invention also eliminates the need for crane support during milling operations. The savings of time are particularly significant when applied to turbine pumping grooves, since the turbine is brought back on line faster. To accomplish the milling operation, a single operator merely aligns the milling head to the groove layout, switches on the magnet, adjusts the clamp means, and machines a portion of the groove. Each milling segment of the pumping groove operation can thus be accomplished in a matter of minutes. As explained and illustrated above, because the milling machine is attached to the magnet the amount of travel along the groove is limited. Therefore, the entire apparatus must be repositioned after each segment is cut in order to allow the milling head to continue the cut.

The present invention thus also provides novel methods of cutting a groove in a structure and, more particularly, for cutting a pumping groove in the cylinder joint of a steam turbine. First, the desired location for the groove is identified and a milling head affixed to a magnetic base that can be selectively activated (energized) is positioned precisely over the groove location. The magnetic base is then energized and becomes magnetically affixed to the surface in which the groove is to be cut. Clamping means that are attached to the magnetic base are then adjusted to urge against the structure and retain the milling head and magnetic base in position. Preferably, the step of adjusting and affixing the clamping means comprises the steps of sliding two or more clamp blocks along clamp rods attached to the magnetic base, affixing to the clamp rods the clamp blocks in a clamping position, and adjusting screws threaded through the clamp blocks to urge against the structure in which the groove is being cut to lock the apparatus in position. The milling head is then activated and at least a portion of the groove is cut by moving the milling head relative to the magnetic base.

To complete the machining of a groove, the methods of the present invention further include the steps of switching off the milling head, releasing the clamp means from engagement with the structure and deactivating the magnet to permit moving the apparatus to a subsequent location in order to extend the groove. This series of steps is repeated until the entire milling operation has been completed. Those of ordinary skill will recognize that the above described operation of cutting a groove in a structure using a milling head affixed to a magnetic base may refer to both enlarging or reworking an existing groove, as well as cutting a fresh groove in a structure.

Numerous variations in the methods and apparatus of the present invention are contemplated. For example, the magnetic base 110 may be further modified or specifically adapted to hold the milling head 100 at an angle to the cutting surface. Also, although a particularly preferred embodiment of a clamping mechanism has been disclosed, those of ordinary skill will immediately recognize that numerous other types of screw clamps, spring clamps and frictional clamps may be adapted to replace or to be used in conjunction with, the clamping device described. Finally, although the present invention provides a unique solution to a specific problem related to milling pumping grooves in steam turbines, the present invention is not meant to be limited in scope to this application. Accordingly, reference should be made to the appended claims in order to ascertain the scope of the present invention.

What is claimed is:

1. Apparatus for milling a groove in a magnetic structure comprising:
   a milling head;
   a selectively energized magnet affixed to the milling head, the magnet being secured to the structure when energized; and
   clamp means comprising at least two clamp bars, at least two clamp blocks and at least one clamp screw in threaded engagement with a clamp block for engaging, independently of activation of the magnet, the structure to be milled for maintaining alignment of the milling head to the structure during the milling operation.

2. The apparatus of claim 1, wherein the milling head operates using 110 volt alternating current.

3. The apparatus of claim 1, wherein the magnet is an electrically activated magnet.

4. The apparatus of claim 3, wherein the magnet operates using 110 volt alternating current.

5. The apparatus of claim 1, wherein the clamp blocks are in sliding engagement with the clamp bars and further comprise set screw means to affix the clamp block relative to the clamp rod.

6. Apparatus for milling a groove in a structure comprising:
   a milling head;
   an electric magnet affixed to the milling head;
   at least two clamp bars affixed to the electric magnet;
   at least two clamp blocks, one of each adjustably affixed to one of the clamp bars; and
   at least two clamp screws for engaging the structure to be milled, said clamp screws being connected to the clamp blocks.

7. The apparatus of claim 7, wherein the clamp blocks are in sliding engagement with the clamp bars and further comprise set screw means to affix the clamp blocks relative to the clamp bars.

8. A method of cutting a groove in a structure comprising the steps of:
   determining the location where the groove is to be cut;
   placing a milling head that is affixed to a magnet that can be selectively activated, in the location of the groove;
   activating the magnet, thereby magnetically affixing it to the structure;
   affixing clamping means to the structure to maintain the milling head in position
   wherein the step of affixing clamping means further comprises the steps of: sliding clamping blocks along clamp bars until the clamping blocks are proximate to the structure; affixing the blocks relative to the bars; and adjusting screw means within the blocks to urge against the structure;
   activating the milling head; and
   cutting the groove.

9. The method of claim 8, further comprising the steps of:
   deactivating the milling head and magnet;
   removing the clamping means from engagement with the structure; and
   moving the apparatus to a location where the groove is to be continued, and repeating the steps of claim 8.

10. The method of claim 8 wherein the groove is cut in a substantially planar surface.

11. The method of claim 8 wherein the groove cut follows substantially along the contour of an existing groove, whereby the existing groove is redimensioned.

12. The method of claim 8 wherein the structure is a steam turbine.

13. The method of claim 12 wherein the structure is a surface of the horizontal joint of a steam turbine.

14. The method of claim 12, wherein the structure is an existing structure being reconditioned.

* * * * *